United States Patent [19]

Poetsch

[11] 4,310,856

[45] Jan. 12, 1982

[54] METHOD AND APPARATUS FOR THE TELEVISION SCANNING OF FILMS

[75] Inventor: Dieter Poetsch, Ober-Ramstadt, Fed. Rep. of Germany

[73] Assignee: Robert Bosch GmbH, Stuttgart, Fed. Rep. of Germany

[21] Appl. No.: 151,781

[22] Filed: May 21, 1980

[30] Foreign Application Priority Data

May 30, 1979 [DE] Fed. Rep. of Germany ....... 2921934

[51] Int. Cl.³ .............................................. H04N 3/36
[52] U.S. Cl. .................................... 358/214; 358/54; 358/215
[58] Field of Search .................. 358/214, 215, 54, 216

[56] References Cited

U.S. PATENT DOCUMENTS

| 3,976,832 | 8/1976 | Millward | 358/214 |
| 4,149,191 | 4/1979 | Longchamp | 358/214 |
| 4,151,560 | 4/1979 | Zinchuk | 358/214 |
| 4,205,337 | 5/1980 | Millward | 358/214 |

FOREIGN PATENT DOCUMENTS 2735685  2/1979  Fed. Rep. of Germany ...... 358/214

Primary Examiner—Michael A. Masinick
Attorney, Agent, or Firm—Frishauf, Holtz, Goodman & Woodward

[57] ABSTRACT

A system for the television scanning of films is proposed in which the film is continuously moved and is scanned without interlacing. The respective signals belonging to a scanned line are read into a frame store at an address characterizing the position of the line within the film frame and are read out once again in accordance with the television standard. In so doing, the respective address is formed either by counting pulses derived from the line and frame frequency of the television standard (coupled operation) or by counting pulses derived from the film speed (uncoupled operation).

23 Claims, 1 Drawing Figure

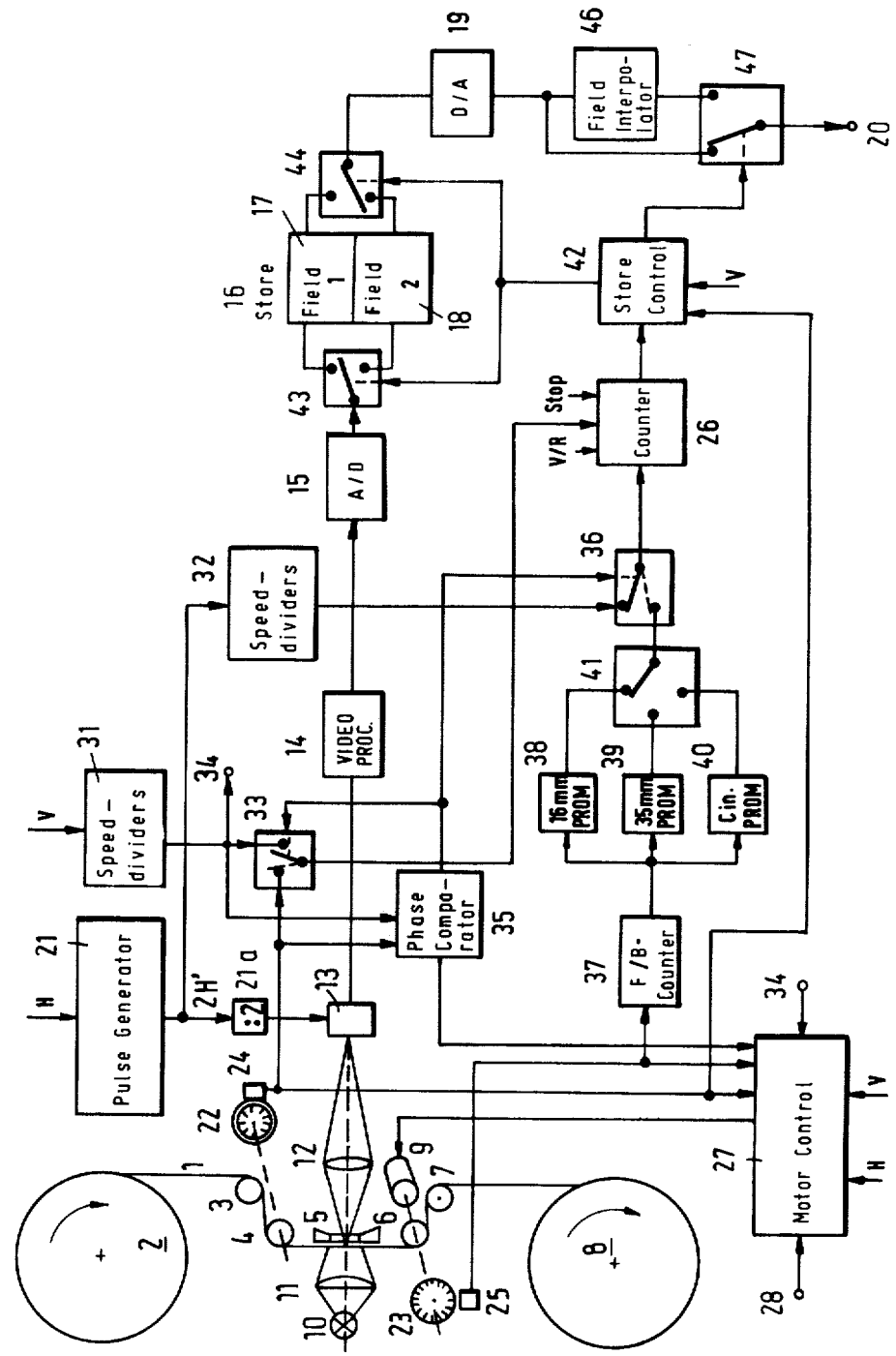

METHOD AND APPARATUS FOR THE TELEVISION SCANNING OF FILMS

BACKGROUND OF THE INVENTION

The present invention relates to a method and apparatus for the television scanning of films. Such apparatus is already known from German Patent Disclosure Document DE OS 27 35 685 in which a film is scanned line by line without interlacing, the signals which belong respectively to a scanned line are read in to a frame store as an address characterising the position of the particular line within a film frame and the content of the frame store is read out in accordance with the television standard. However, visible disturbances in the reproduced television picture are produced by various mechanical inaccuracies in take-up rollers of the film scanner which disturbances cannot be overcome due to the address production directly associated therewith.

SUMMARY OF THE INVENTION

The present invention provides a method for the television scanning of a film wherein the film is scanned lineby line without interlacing, the signals which belong respectively to a scanned line are read in to a frame store at an address characterising the position of the particular line within a film frame and the content of the frame store is read out in accordance with the television standard. In accordance with the invention, at film speeds at which the ratio of the field frequency of the television standard to the number of film frames scanned per unit time is a whole number multiple, i.e. during coupled operation, the particular address is produced by counting pulses derived from the line and frame frequency of the television standard; and at other film speeds, i.e. in uncoupled operation the particular address is produced by counting pulses which are produced by means sensing the position of the film.

The method in accordance with the invention has the advantage that, at predetermined film speeds, visible disturbances no longer occur in connection with many types of operation of the film scanner or many film speeds due to the permanent coupling with the studio clock, i.e. in coupled operation.

The present invention also provides apparatus for the television scanning of a film wherein the film is scanned line by line without interlacing. The apparatus includes means for producing digital signals which belong respectively to a scanned line, means for writing said signals into a frame store, means for producing an address characterising the position of the particular line within a film frame in the frame store, and means for reading out the content of the frame store in accordance with the television standard.

According to the invention, means are provided for producing a particular address by counting pulses derived from the line and frame frequency of the television standard at film speeds at which the ratio of the field frequency of the television standard to the number of film frames scanned per unit time is a whole number multiple (coupled operation), and means for producing the particular address by counting pulses which are produced by sensing the position of the film at other film speeds i.e. in uncoupled operation.

It is preferred that the same capstan roller diameter is used for different film formats.

DRAWING

The single FIGURE shows diagrammatically a television film scanning system according to the invention wherein individual elements are only illustrated insofar as they are necessary for the understanding of the invention.

DESCRIPTION OF THE PREFERRED EMBODIMENT

A film 1 to be scanned is unwound from a storage spool 2 and is transported to a take-up spool 8 over a guide roller 3, a toothed roller 4, a film gate 5, a capstan roller 6 and a further guide roller 7. The film speed is determined by the capstan roller 6 which is driven by a capstan motor 9 whilst the devices (not shown in the FIGURE) for driving the spools 2 and 8 are simply controlled so that the film moved by the capstan roller is correspondingly unwound and taken-up.

The film is illuminated by a lamp 10 which is provided with a condensor 11. The film is scanned in lines by projection onto the line forming opto-electric converter 13. For explaining the invention, only one opto-electric converter 13 is provided in the system according to the FIGURE, however, the use of the invention is not dependent on whether it is a question of film scanning for coloured or black and white television. In the case of coloured television, there are preferably three converters in place of the single opto-electric converter, onto which the light is projected with the aid of a known colour separation device. A fuller disclosure of exactly how to scan the film and produce the line by line signals is given in the aforementioned German OS 27 35 685.

The output signals from the opto-electric converter 13 are amplified and if necessary are subjected to corrections known in television technology and which take place in a video processor 14. Then, the signals, which are analogue signals, are converted into digital signals using an analogue-digital-converter 15. As is well known, digital signals may be easily stored without loss of quality. For this purpose, the output from the analogue-digital-converter 15 is connected to a store 16 which consists of two field stores 17 and 18. The content of a complete television picture can be stored in the store, if necessary, including the colour information. The digital television signals are read out of the stores 17 and 18 in accordance with the television standard, are once again converted into analogue signals in a digital-analogue-converter 19 and are available at the output 20 of the system.

The line by line scanning of the film frames, that is to say the control of the opto-electric converter 13, takes place with the aid of a line frequency H' generated by a scanning pulse generator 21 (2H') and then halved in a divide-by-2 circuit 21a. The frequency of the pulse generator 21 is varied to a greater or lesser extent from the line frequency H of the television standard in accordance with the film format. Since, during the vertical fly-back periods, no information is transmitted by the television signal, the frame content is not divided into 625 lines but into about 590 lines (with the European television system). If the continuously moving film was to be scanned at the same line frequency then the same percentage of the film would not be transmitted either. Since, an intermediate space or gap, i.e. a frame separating line is located between the individual film frames and which does not normally correspond to a portion of the vertical fly-back period, a variation in the line frequency during scanning is required according to the width of the said intermediate space. If, for example, when scanning according to the European television standard, the intermediate space is larger than 8% of the frame height, then a scanning at a somewhat higher frequency is necessary. However, since these differences are relatively slight both with 16 mm and 35 mm film, it is sufficient to vary the repetition frequency whilst the time, during which a line is scanned, can be maintained constant so that with an insignificant increase in the line repetition frequency only the horizontal period blanking interval becomes shorter but the so-called active line period remains the same. The pulses derived from the line frequency of the television standard are generated by a phase controlled oscillator operating at 2484 times the line frequency.

For the derivation of an address which corresponds to the position of the particular line within the film frame, pulses are derived on the one hand from the untoothed roller 4 and which are associated with the upper and lower edge of each frame and pulses are derived from the capstan 6 which are brought into play for counting. For this purpose, an index plate 22 or 23 is associated respectively with the toothed roller 4 and the capstan 6. These index plates are provided with optical, mechanical or magnetic graduations which are sensed with the aid of a transducer 24, 25. Thus, for example, a pulse is generated in the transducer 24 as soon as the film has been advanced by one perforation division. These pulses are fed to the setting input to an address counter 26 through elements, the function of which will be described later.

A motor control circuit 27 serves for controlling the capstan motor 9, to which are supplied on the one hand the frame dividing line pulses and line counting pulses delivered by the converters 24 and 25 and on the other hand synchronising signals H and V from the television system. With the aid of the motor control circuit 27, the capstan motor 9 is so controlled that during reproduction at normal speed, the film is transported synchronously with the television synchronising signals. These circuits are sufficiently well known both in connection with film scanners and with video magnetic recording apparatus and need not be described in further detail in this connection. For the slow motion and time-lapse reproduction of the film, it is possible for the capstan motor to run at another speed for which purpose a control voltage can be supplied to the motor control circuit 27 through an input 28.

So that the film is transported synchronously with the television synchronising signals, not only at normal speed but also at other speeds, two (coupled) speed dividers 31, 32 are provided. With the aid of these dividers, it is possible to so couple film speeds to the field frequency that the ratio of the field frequency to the number of scanned film frames per second, is a whole number multiple thus, for example, at 50 F/s=1, at 25 F/s=2, at 16⅔ F/s=3, at 12½ F/s=4, at 6¼ F/s=8. Moreover, frame synchronising pulses V are applied to the divider 31 and H' pulses (2H') are applied to the divider 32. The output from the divider 31 is connected to a switch 33, and also via a terminal 34 to the motor control circuit 27. The output from the divider 31 is also connected to an input to a phase comparator circuit 35, the other input of which is connected to the transducer 24. The output from the circuit 35 is fed to the motor control circuit 27 and the switch 33 to a switch 36. The output from the divider 32 to the switches 33 and 36 is used to control the position of the switch.

The output from the transducer 25 is connected through a forwards-backwards counter 37 to each of three fixed value stores 38, 39 and 40 in the form of programmable read only memories (PROM), which read out the pulses delivered by the transducer 25 in a manner depending on the film format used —16 mm, 35 mm, 35 mm Cinemascope. The particular store associated with the appropriate film format can be connected to the switch 36 through a selector switch 41. The output from the switch 36 is connected to the input to the address counter 26, the output from which is connected to a store control 42. The store control 42 controls the switches 43, 44 associated with the store 16 as well as the switch 47 associated with a field interpolator 46. When switching on the television film scanner for normal operation, that is to say with a film speed of 25 F/s in the forward direction, the film is first of all transported during a starting up phase in the so-called "uncoupled type of operation". In so doing, the switch 41 is connected to one of the fixed value stores 38, 39 or 40 in accordance with the appropriate film format. The switch 36 is in the lower dotted position so that the address counter 26 receives address pulses derived from the index plate 23 of the capstan 6. Moreover, the switch 33 is likewise in the dotted position so that the setting input to the address counter 26 is controlled by the pulses from the toothed roller index plate 22. The fixed value stores preferably have the following divisers: store 38 a factor of 2484; store 339 a factor of 2146; and store 40 a factor of 3450.

The store control 42 switches over the switches 43 and 44 simultaneously. It leaves the switch 43 in one position long enough for the video signals to be transferred to one of the field stores 17 or 18 until it is filled up. Moreover, the read out switch 44 connects the other field store 18 or 17 to the output 20 for the same length of time whereby the missing intermediate line of the missing field is generated with the aid of the field interpolator 46 by the averaging of two adjacent lines. In so doing, the switch 47 is switched by the store control 42 at frequency V.

The motor control circuit 27 then increases the motor speed of the capstan motor 9 until the latter has reached the nominal speed—through the film drive, for example the toothed roller 4, index plate 22, transducer 24 after phase comparison with the studio clock in the circuit 35. When the film speed agrees with the V frequency delivered by the studio pulse generator, the film scanner switches into the so-called "coupled type of operation", that is to say the film is then transported synchronously with the studio television clock. In so doing, the switches 33 and 36 are brought into the illustrated position so that the address counter 26 is connected to the coupled speed dividers 31 and 32.

The switch 43 is then switched every alternate line and the switch 44 every alternate field (full frame read in) wherein a predetermined phase difference must be maintained between the film scanning and the reading out of the television signals from the store 16 so as to be able to associate each television picture with a scanned film frame. However, since with television a field is transmitted and then a second field interlaced line by line therewith, whereas when scanning with the system in accordance with the invention the film itself is scanned line by line, this phase difference must be selected large enough for the last line of each film frame to be read into each field store 17, 18 before the last line of the first field needs to be read out from the store 17. On the basis of these considerations, a phase difference of about one field results. Moreover, the switch 47 is likewise in the illustrated position so that the switch 44 is connected directly to the output 20 through the D/A converter 19.

With the "coupled type of operation" it is also possible, as already described, to transport the film synchronously with the studio clock at other film speeds which are at a particular relationship with respect to the field frequency. For this purpose, the dividers 31 and 32 are switched in automatically by selector keys corresponding to the selected film speed, for example, 16⅔ or 16¼ F/s. The switches 33 and 36 are in the illustrated position. The switch 43 is then no longer always switched over in the V intervals at line frequency but at frame frequency according to the choice of film speed so that a respective film frame is read into a field store 17 or 18. Since, the switch 44 controlled at field frequency is always switched over in the V interval, a cutting edge between two film frames is no longer visible.

The same method of operation of the film scanner applies to a film speed of 25 F/s for the reverse run wherein only the forwards/backwards (V/R) input to the address counter 26 needs to be set correspondingly.

With the "uncoupled type of operation" and a film speed of below 50 F/s, the film scanner is operated as in the starting up phase for normal speed and at a speed of more than 50 F/s, only the switch 44 is switched over at V frequency whilst the switch 43 is switched over per film frame and the switch 47 remains in the illustrated position.

The apparatus has been designed for a normal operating speed of 25 F/s.

For the production of a still frame from the film drive, the address counter 26 is blocked by a "stop" signal after a complete film frame has been read into the store 16 and the field stores 17 and 18 are read out alternately during a stop from the normal speed at field frequency whilst at the stop the field store filled with the last film frame is read out at all other speeds wherein the missing intermediate lines from the missing field are generated by the field interpolator 46.

For the production of a still frame, the film speed is reduced until the film is stationary and is positioned in the frame gate at the position of the last stored film frame.

It is apparent from the above description that the same toothed roller 4 is used to generate pulses from the transducer 24 irrespective of the film format being scanned (e.g. 16 mm; 35 mm; 35 mm Cinemascope) and that the fixed value stores 38, 39, 40 produce a division of the line pulses from the transducer 25 depending on the format being scanned. Further, the outputs from the fixed value stores are used to generate the required odd numbered division ratios.

The film, thus, is scanned line-by-line, sequentially and without interlacing. The signals which belong respectively to a scanned line are read into the frame store 16 in the respective frame or field store portions 17, 18, at addresses which characterize the position of the particular line within a film frame as determined by the address counter 26, the particular field store 17 or 18, respectively, being switched by switching signals from the store control 42. Read-out will be of the respective entire stores under control of the switch 44 which, again, is controlled by the store control 42 as above described, so that, consequently, sequential entire fields are read out with line interlace.

The counter 26 produces the particular address by counting pulses derived from the line and frame frequencies of the television standard at film speed; the line frequencies, of course, are derived from the pulse generator 21 and the speed divider 32, and the frame frequency from the vertical speed divider 31. The counter, then, operates in coupled operation, that is, at the clock frequency of the television standard, derived from the studio television clock. Recognition that the film speed at which the ratio of field frequency of the television standard to the number of film frames scanned per unit time is a whole number multiple, that is, that the film operates at a speed providing for coupled operation, is provided by the phase comparator 35. During start-up operations, and if the film speed should not correspond to that which permits scanning in accordance with television standards, uncoupled operation is resorted to, in which the particular address generated by the counter 26 is produced by counting pulses which are generated by the elements coupled to the film motion itself, namely the scanning disks 22, 23, which produce corresponding pulses in the transducers 24, 25, and particularly the pulses from transducer 25 coupled through the forward/backward counter 37, the respective PROMs 38–40 and the switch 41 to the counter 26.

What is claimed is:

1. In a method for the television scanning of a film wherein the film is scanned line by line without interlacing, the signals which belong respectively to a scanned line are read into a frame store (16; 17, 18) at an address characterizing the position of the particular line within a film frame and the content of the frame store is read out in accordance with the television standard, the improvement comprising the steps of
    producing the address by counting pulses derived from the line and frame frequency of the television standard at film speeds at which the ratio of the field frequency of the television standard to the number of film frames scanned per unit time is a whole number multiple, or in coupled operation;
    and producing the address by counting pulses which are produced by means sensing the position of the film at other film speeds, or in uncoupled operation.

2. A method according to claim 1 including the steps of storing alternate lines in a respective one of two field stores (17, 18);
    and the step of alternately sequentially reading out of the entire field stores.

3. A method according to claim 1 wherein with coupled operation, during a starting up phase, the address of the pulses produced by the means sensing the position of the film is deduced until correspondence is reached between the phase of these pulses and the pulses derived from the field frequency of the television standard.

4. A method according to claim 1 wherein both with coupled and also with uncoupled operation, with the exception of normal operation and a film speed of less than 50 frames per second, a particular film frame is read into a first field store and simultaneously the previous frame is read out of a second field store until the new film frame has been read into the first field store and that the missing interlaced line of the missing field is generated in accordance with the television standard by interpolation of two adjacent field lines.

5. A method according to claim 1 or 4, wherein during uncoupled operation and with a film speed higher than 50 frames per second one film frame is read into a field store and simultaneously read out of the field store in a field manner.

6. A method according to claim 1 wherein pulses are derived from the rotation of a roller in contact with the film, wherein the same roller diameter is used for different film formats, the line pulses corresponding to the particular film format being produced by division of the pulses generated by the roller and wherein an interpolation division list is read out of a fixed value store for generating the required odd numbered division ratios.

7. A method according to claim 1 wherein for generating a still frame from the film, a complete film frame is read into the field store and the reading into the store is then blocked, wherein the film speed is reduced until stationary and the film is positioned in the frame gate at the position of the last stored film frame.

8. A method according to claim 7 wherein the field stores are read out alternately at the field frequency by a stop at normal speed (25 F/s forwards).

9. A method according to claim 7 wherein the field store filled with the last film frame is continuously read out by a stop at all other speeds and at all speeds in reverse drive, and that the second field required in accordance with the television standard is generated by interpolation of adjacent field lines.

10. A method according to claim 1 wherein the pulses derived from the line frequency of the television standard are generated by a phase controlled oscillator the frequency of which amounts to 2484 times the line frequency.

11. A method according to claim 10 wherein the oscillator frequency for generating the address pulse frequency during the scanning of films of 16 mm format is divided by the factor 2484, during the scanning of films of 35 mm format is divided by the factor 2146, during the scanning of films of 35 mm Cinemascope format is divided by the factor 3450.

12. A method according to claim 10 wherein for fitting the position of the frame of the scanned film frame in the frame reproduced in accordance with the television standard only a portion of the scanned lines is read into the frame store beginning with a starting address associated with the particular film format.

13. In apparatus for the television scanning of a film wherein the film is scanned line by line without interlacing, and comprising means for producing digital signals which belong respectively to a scanned line, means for writing said signals into a frame store, means for producing an address characterising the position of the particular line within a film frame in the frame store, and means for reading out the content of the frame store in accordance with the television standard, the improvement comprising the provision of means for producing a particular address by counting pulses derived from the line and frame frequency of the television standard at film speeds at which the ratio of the field frequency of the television standard to the number of film frames scanned per unit time is a whole number multiple (coupled operation), and means for producing the particular address by counting pulses which are produced by sensing the position of the film at other film speeds (uncoupled operation).

14. Apparatus according to claim 13, wherein the frame store comprises two field stores, and wherein there are means for writing alternate lines into respective field stores, and means for simultaneously reading out the stores in a field manner.

15. Apparatus according to claim 13 wherein the frame store comprises two field stores, and wherein there are means for detecting one of the following conditions, coupled operation, uncoupled operation, normal operation (25 F/s forwards) and a film speed of less than 50 frames per second, means for writing a particular film frame into a first field store in response to said detecting means, means for simultaneously reading the previous frame out of a second field store until the new film frame has been read into the first field store in response to said detecting means, and an interpolator for generating the missing interlaced line of the missing field in accordance with the television standard by interpolation of two adjacent field lines.

16. Apparatus according to claim 13 wherein the frame store comprises two field stores and wherein there are means for detecting uncoupled operation, means for detecting a film speed higher than 50 frames per second and means for writing one film frame into a field store and simultaneously reading the frame out of the field store in a field manner.

17. Apparatus according to claim 13 and comprising a roller in contact with the film for deriving pulses as a function of the rotation of the roller, the same roller diameter being used for different film formats, means for producing line pulses corresponding to the particular film format by division of the pulses generated by the roller, a fixed value store containing an interpolation division list, means for reading said list out of the fixed value store for generating the required odd numbered division ratios.

18. Apparatus according to claim 13 and comprising means for writing a complete film frame into a field store, means for reducing the film speed to zero, means for positioning the film in the film gate at the position of the last stored film frame whereby to generate a still frame from the film.

19. Apparatus according to claim 18 and comprising means for reading out the field stores alternately at the field frequency by a stop at standard speed (25 F/s forwards).

20. Apparatus according to claim 18 and comprising means for continuously reading out the field store filled with the last film frame by a stop at all speeds but the standard speed and at all speeds in reverse drive, and interpolating means for generating the second field required in accordance with the television standard by interpolation of adjacent field lines.

21. Apparatus according to claim 13, wherein the pulses derived from the line frequency of the television standard are generated by a phase controlled oscillator the frequency of which amounts to 2484 times the line frequency.

22. Apparatus according to claim 21 wherein the oscillator frequency for generating the address pulse frequency during the scanning of films of 16 mm format is divided by the factor 2484, during the scanning of films of 35 mm format is divided by the factor 2146, during the scanning of films of 35 mm Cinemascope format is divided by the factor 3450.

23. Apparatus according to claim 21 wherein for fitting the position of the frame of the scanned film frame in the frame reproduced in accordance with the television standard only a portion of the scanned lines is written into the frame store beginning with a starting address associated with the particular film format.

* * * * *